United States Patent [19]

Vezirian

[11] Patent Number: 4,776,599
[45] Date of Patent: Oct. 11, 1988

[54] DYNAMIC PACKING RING SEAL SYSTEM

[76] Inventor: Edward Vezirian, 110 Firwood, Irvine, Calif. 92714

[21] Appl. No.: 106,539

[22] Filed: Oct. 19, 1987

[51] Int. Cl.$^4$ .......................... F16J 15/24; F16J 15/34
[52] U.S. Cl. .......................... 277/95; 277/84; 277/165; 277/184; 251/315
[58] Field of Search ............... 277/95, 165, 184, 226, 277/84; 251/314-316

[56] References Cited

U.S. PATENT DOCUMENTS

| | | | |
|---|---|---|---|
| 2,147,771 | 2/1939 | Hathaway | 277/226 X |
| 2,647,778 | 8/1953 | Shields | 277/226 |
| 3,269,692 | 8/1966 | Shafer | 251/315 X |
| 3,575,431 | 4/1971 | Bryant | 251/315 X |
| 3,661,197 | 5/1972 | Peterson | 277/226 X |
| 3,862,762 | 1/1975 | Millsap | 277/92 |
| 3,944,306 | 3/1976 | Neilson | 277/95 X |
| 4,059,280 | 11/1977 | Eastwood | 277/165 X |

FOREIGN PATENT DOCUMENTS

| | | | |
|---|---|---|---|
| 872122 | 6/1971 | Canada | 277/84 |
| 728803 | 4/1932 | France | 277/184 |
| 80491 | 3/1963 | France | 277/95 |
| 18268 | 5/1882 | Fed. Rep. of Germany | 277/266 |
| 1650296 | 2/1970 | Fed. Rep. of Germany | 251/315 |
| 2359589 | 6/1974 | Fed. Rep. of Germany | 277/165 |

Primary Examiner—Robert S. Ward

[57] ABSTRACT

A seal system for closing the running clearance between two relatively rotating structural members, wherein an elastomeric annular packing ring has a first annular portion pressed into an undersized annular locking channel, formed by and within one structural member, so as to retain the ring immovably therein, and thus to distend the remaining second annular portion of the ring, which is now dynamically and internally biased, across an open working chamber into impingement upon the smooth annular sealing surface of the opposing structural member to achieve an activated seal which is operable over large relative excursions of the structural members.

3 Claims, 2 Drawing Sheets

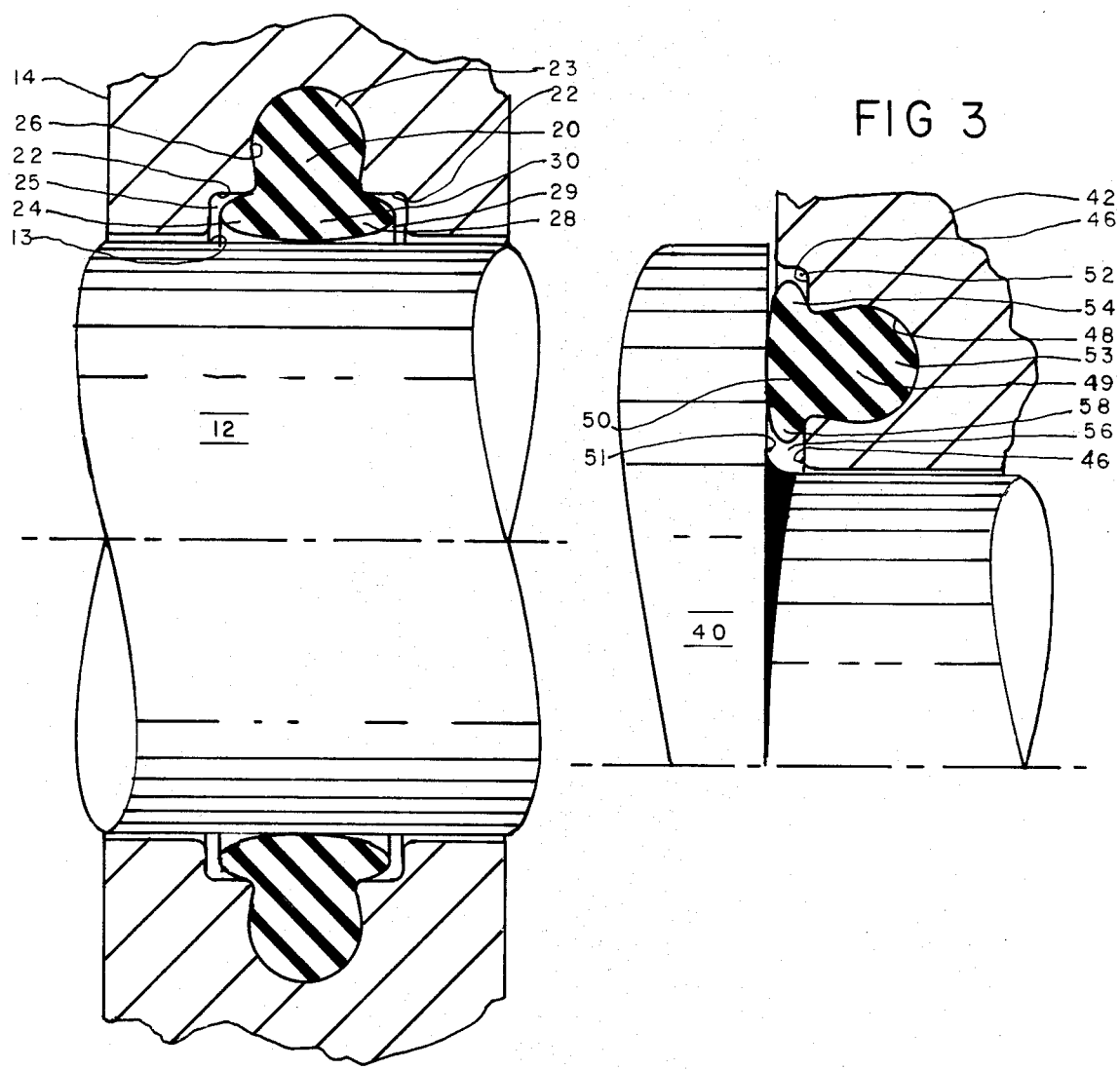
FIG 3
FIG 1
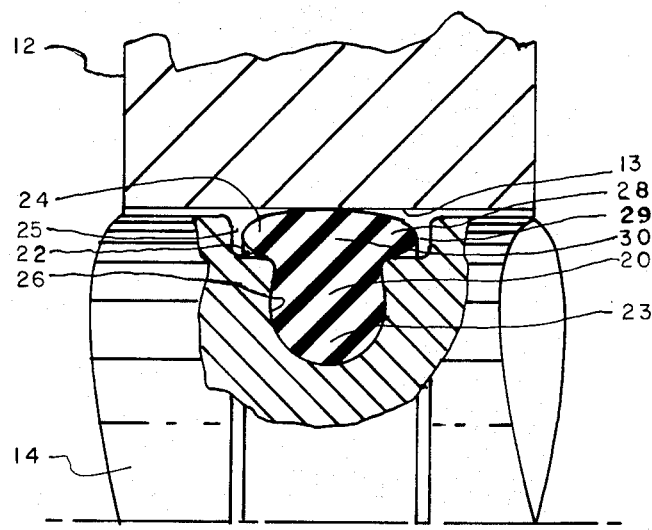
FIG 2

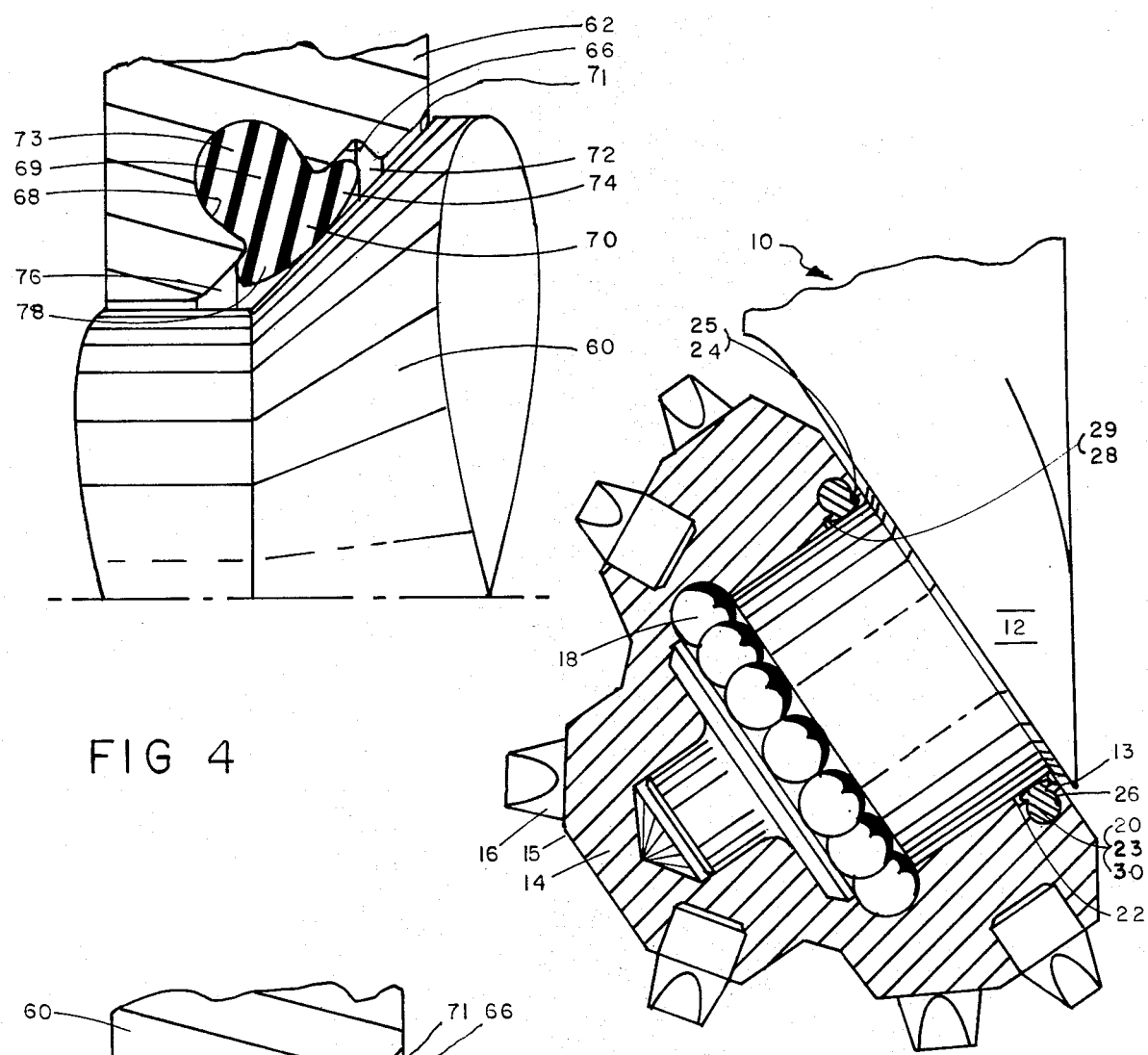

DYNAMIC PACKING RING SEAL SYSTEM

BACKGROUND OF THE INVENTION

1. FIELD OF THE INVENTION

This invention pertains to a dynamic packing ring seal used to close the running clearance between two relatively rotating structural members, thus forming a mutually exclusive barrier to effectively isolate two incompatibly differing environments. This invention relates to such a seal used, for example to retain lubrication within a bearing space, while excluding foreign matter from the external environment.

More specifically, this invention relates to a seal displaying a capacity to maintain isolation of the two differing environments during very large relative excursions of the two structural members, as compared to relative excursions sealed by conventionally housed elastomeric packing ring seals.

2. DESCRIPTION OF THE PRIOR ART

Elastomeric packing ring seals have been extensively studied and tested and used for many years, their capabilities and limitations are generally very well known and published. The design handbooks published by the manufacturers of such rings usually carry the disclaimer that any particular seal design may be enhanced, over and above a stock handbook design, by practical experiment and testing. In practice, the final design is not likely to deviate noticeably from the original handbook design, however.

The universal standard packing ring of the industry is the well known O-ring. Although rings of other cross-sectional shapes are available, the basic rules and functions are common to all. The choice of elastomer has a pronounced influence on such factors as thermal effects, durometer hardness, and permanent set, however the effects are generally too small to effect the gland design.

In sealing the bearings of a rotary rock bit for the oil field, the most demanding heavy duty design requirements are faced, and perhaps the most revealing study of the prior art may be found.

An early effort to use an elastomeric packing ring seal in a rock bit is described by Swart, et. a., in U.S. Pat. No. 3,299,973 (issued on Jan. 24, 1967), wherein the seal is trapped between a radially extending face on a rotating rock cutting cone, and a conical surface of a supporting journal. In this application, the elastomeric body of the O-ring is held in tensile extension, being more or less stretched in response to the excursion of the cutter relative to the journal. Elastomeric rings should not be stored or used in conditions of tensile extension, if life expectancy is a criterion of judgement, especially at elevated temperatures. Such a ring in tension tends to crack and split radially. The use of an elastomeric ring in tensile extension seems also to aggravate the problem of permanent set in the elastomer.

Standard O-ring practice is to place the ring in compression, at least in the primary axis of its action in a particular design, and to provide a generous clearance in one inactive axis to provide for tolerance stack up and for thermal expansion in use. Used as a seal member, an O-ring is never advisedly placed in tension in any axis. A little tension is advised only when an O-ring is used as a drive belt or as a rubber-band.

U.S. Pat. No. 3,397,928, issued Aug. 20, 1968 to Galle seemed to violate a standard O-ring handbook rule on the amount of compression that may be employed in a dynamic seal design. The handbook limit even at very low relative seal to surface velocities was set at 10%, and '928 taught the use of 10% to 20% in a rock bit bearing application. The handbooks had predicted a shortened life expectancy for an O-ring used at such excessive levels of compression, and the predictions were well founded. However, a rock bits typical useful life expectancy is only about 100 hours, well within the shortened life expectancy of the over-compressed O-ring. The rock bit is used to virtual destruction. The purpose of the seal in a rock bit is to hold seal integrity for as long as possible as bearing wear permits ever larger relative excursions between the rotary rock cutter and its supporting journal shaft. To extend the life of such a seal in a rock bit, a way has to be found to maintain seal integrity over ever larger relative excursions of the structural members, near the end of the useful life of the rock bit when the journal bearings are most rapidly wearing out.

Heat is devastating to the elastomer of any packing ring. As the seal serves to close a running clearance which is constantly in flux, internal friction within the elastomer is converted to heat. This heat is relatively difficult to dissipate because the elastomer itself is a poor conductor of heat.

On Oct. 16, 1973, U.S. Pat. No. 3,765,495 issued to Murdock et. al., teaching the use of a packing ring having an oval cross section in a rock bit. This design provides an enlarged dimension to the radial extent of the ring without expanding the axial dimension of the ring, as such an axial expansion would serve to reduce the space allocated to the length of the journal bearing. The enlarged radial dimension enabled the use of an adequate radial compression dimension without exceeding the handbook recommendations on the percentage of that same compression. The use of a lower percentage of compression also served to reduce the internal frictional heating of the elastomer, and the relatively low axial dimension of the ring coupled with the increased surface area of the ring served to aid in the dissipation of that internal heat.

Whereas Galle, in '928, showed dimensions in the specification which allowed the ring to be held stretched over the journal shaft surface by as much as 10% of the inside ring diameter. (In addition to the axial compression of the ring itself by 10% to 20% of the nominal cross section of the ring.) This is another case of the tensile extension discussed above in relation to Swart et. al. '973. Murdock, '495 was the first to properly address this problem of tensile extension.

Murdock, '495, uses the conventional clearance on the inactive axial direction to provide space for tolerance buildup and thermal expansion of the elastomeric ring.

A very small running clearance is provided between the sealing surface of the journal shaft and the radially extending side walls of the gland to avoid the potential danger of differential pressures across the seal extruding the elastomer into the running clearance on the low pressure side of the seal.

Murdock suggests a relatively coarse surface within the gland channel, to urge the ring to preferentially rotate with the member forming the channel. Actually, as a practical matter, the ring naturally alternates between clinging to the channel member and clinging to the plain smooth member. For example, suppose the ring is rotating with the channel initially. Frictional heat caused a slight tightening of the ring on the non-rotating shaft until friction with that sealing surface overcomes the roughened grip with the channel, then the channel rotates against the static ring. This condition persists until wear of the ring against the roughened channel surfaces reduces the friction therebetween, and perhaps frictional heat has been dissipated to loosen the grip slightly between the ring and the smooth seal surface, and the ring again rotates with the channel, etc. It should be here noted that, although the wear is actually distributed cyclically over differing surfaces of the packing ring, a roughened surface on one member would serve to increase the rate of wear during one part of the cycle, and would present a poor dynamic seal in cooperation with the packing ring during the remaining part of the cycle.

Except for those rock bits using the seal design of Murdock et. al. rock bits employing packing ring seals do not utilize a channel at all, but depend rather on a "corner gland", wherein the elastomeric ring is trapped between a right corner formed by the juncture of the supporting journal shaft and its supporting leg, and a second reverse corner occurring at the juncture of the internal surfaces of a counterbore formed at the mouth of the journal bore in the cutter cone. Use of the corner gland serves to aggravate two problems which sometimes occur in packing ring seals, "snaking", and "bunching", both being due to an excess amount of gland side clearance being provided for tolerance accumulation and thermal expansion.

"Snaking" describes a condition in which the seal ring, which is normally static relative to one structural member and simultaneously dynamic relative to the other structural member, will switch modes at some local point on the ring circumference. This causes a disarray of forces circumferentially about the ring characterized by the ring piling up on alternating sides of the gland thermal clearance, somewhat snakelike. Then the ring is alternatively squeezed more or less along its length. This instability tends to be self sustaining, is deleterious to both seal ring and gland, and can serve to pump environmental material in one direction or the other across the seal.

"Bunching" starts in the same way as snaking, but the piling up stays concentrated at the point or points of initiation, causes serious leaking, and is apt to break the seal ring itself.

Another type of problem associated with O-rings, called "Rolling", must have been named before it was really understood. Unvarying evidence indicates that rolling is not a dynamic problem as are snaking and bunching. Rolling is a condition established by carelessness in assembly, wherein the O-ring is installed twisted so that the moldline flash spirals about the ring over its circumference. It has been shown that a ring so installed does not change its orientation during use. The danger presented by rolling is that the spiral flash may provide a leak path past the seal, particularly when first placed in service, while the moldline flash is most prominent.

Other innovative packing ring seal designs intended for heavy duty have failed to acquire wide marketability for some reason or another. Examples from the prior art include:

| | |
|---|---|
| Robinson | U.S. Pat. No. 3,656,764 |
| Nielson | U.S. Pat. No. 3,944,306 |
| Shields | U.S. Pat. No. 4,168,868 |

SUMMARY OF THE INVENTION

It is an object of this invention to provide a heavy duty dynamic packing ring seal system for closing the running clearance between two structural members which are relatively rotatable about a substantially common axis, particularly during perturbations in the rotational motion. The primary object of this invention is to provide such a seal system with an enhanced capability of maintaining integrity in the isolation between a closed lubricated environment of a bearing space and the open polluted external environment during erratic or eccentric relative motions of the structural members.

This invention pertains to a packing ring type seal system for closing the variable running clearance between two relatively rotating structural members. The first structural member forms a smooth annular sealing surface concentrically located about the substantially fixed mutual axis of rotation. The second structural member forms a similar annular surface, having a spaced apart relationship to the smooth annular surface formed by the first structural member. These two annular surfaces with the spaced apart relationship structurally define an annular working chamber which is an important part of this seal system. An annular locking channel is formed by and within the second structural member, centrally located on the annular surface thereof. The locking channel extends normally away from the annular chamber. The channel is said to be "locking" by virtue of the fact that it is undersized with respect to the incompressable solid elastomeric annular packing ring, an O-ring for example, which will be only partially housed therein.

A first annular portion of the annular packing ring is pressed or forced or otherwise secured into the locking channel, thereby completely filling the channel, and thus causing the remaining second annular portion of the packing ring, which extends from the locking channel, to be distended by elastomeric material displaced from the first annular portion in the process of installation within the locking channel.

Any solid elastomer (i.e. one not entraining gasses) is substantially non-compressible. When the first annular portion of the packing ring is forced into the locking channel, a portion of the internal bulk of that portion is displaced, due to the undersized capacity of the channel. The displaced material enters the second annular portion of the packing ring, increasing the bulk of that second annular portion, causing that second portion to distend, or to swell with an internal bias. The distended elastomer displays an enhanced responsiveness to outside forces and an enhanced capacity to conform to an impinging surface. (It should be noted that, in conventional prior art practice, as the ring is "squeezed" in a direction normal to the sealing surface, the elastomer is distended into the side running clearances of the gland.)

The distended portion of the elastomer ring extends across the annular working chamber to dynamically impinge the opposing smooth annular sealing surface of the first structural member. The distended portion of the ring is further displaced by impingement against the smooth sealing surface causing further distensions into the working chamber of the instant seal system structure. The behavior of the distended annular portion of the elastomeric ring is analogous to that of an annular bladder filled with grease; it behaves hydraulically. The distension of the ring into the annular working chamber is analogous to a hydraulic reservoir under pressure.

The primary object of the instant invention is to maintain seal integrity over more extreme perturbations without having to resort to the use of excessive squeeze. In the case of a prior art radial O-ring seal given a squeeze of 0.015 inch, for example, examine the expected result of a sudden eccentric displacement of one structural member relative to the other of 0.016 inch. On one side of the seal the elastomer is momentarily squeezed 0.031 inch, while the other side of the seal is left with an unsealed gap of 0.001 inch. On the side with the 0.031 squeeze, the elastomer has been harmlessly distended into the side running clearances of the gland.

In the case of the instant invention, examine the result of the same squeeze/displacement combination. The behavior of the distended annular portion of the elastomeric ring is analogous to that of annular bladder filled with grease; it behaves hydraulically. The elastomeric displacement on the side of the seal with the 0.031 squeeze is constrained against expansion side wise into the working chamber, both by the locking channel and the iso-static tendency of the semi-liquid elastomer. Instead, elastomeric material is displaced circumferentially and distributed around the seal causing an increase in the distension of the unloaded side of the ring maintaining seal integrity.

This explanation is oversimplified for clarity. Actual tests show that the above described prior art seal requires a deflection of about 0.019 inch to produce a leak, and that the corresponding instant seal requires a deflection of about 0.027 inch, using one current design. It is believed that the hydraulic effect cited above is responsible for the slightly elevated capacity of the prior art seal. The instant invention is directed at harnessing that hydraulic effect to significantly enhance the capacity of the seal to handle large deflections without foreshortening the useful life expectancy of the seal.

The use of the undersized locking channel and annular working chamber, may require special tools to install the elastomeric ring. The elastomeric ring cooperates with the locking channel formed by the second structural member, working together as a single unit. Analogously, a tubeless automobile tire cooperates with its locking rim, working as a single unit, and requiring special tools to assemble. Both the ring-channel combination of the seal, and the tire-rim combination of the tubeless tire, are synergistic, the combination being greater than the sum of the two parts.

The portion of the seal ring fixed within the locking channel forms a static seal with the structural member forming the locking channel. This static seal remains static throughout the useful life of the sealing system, being unaffected by relative displacements of the structural members. The interfacial surfaces involved in the static seal are preserved against wear thus maintaining the original level of structural support for the more critical dynamic sealing portions of the system.

The locking channel is formed so as to be totally filled with incompressible elastomer, thus portion of the seal ring contained within the channel is deprived of its capacity of resilient activity and behaves, instead, as a solid part of the member forming the locking channel. It is, therefore, prevented from generating internal heat. The cross sectional shape of the locking channel and of of the elastomeric ring have no constraints indigenous to the practice of this invention, other than that they cooperatively form the described interface free of voids. The interface is also important from a thermal standpoint, aiding significantly in the dissipation of internal heat from the seal. The functions of the gland side clearances of the prior art, providing space for dimensional tolerance variations and thermal expansions, are provided for more efficiently by the side spaces of the annular working chamber.

The distended portion of the annular elastomeric ring may be oriented in any way the designer requires, the most common orientations being:

a. radially outward
b. radially inward
c. axially, for a face seal.

An advantage of this invention is that a lesser amount of squeeze may be relied upon to bridge large relative excursions of the structural members, thus reducing frictional heating and extending the useful life expectancy of a given seal.

Another advantage of this invention is that an elastomeric ring seal is provided in which snaking and bunching cannot occur, the ring being linearly constrained by the locking channel.

The above noted objects and advantages of the present invention will be more fully understood upon a study of the following description in conjunction with the detailed drawings.

BRIEF DESCRIPTION OF THE DRAWINGS

FIG. 1. is an enlarged radial cross-section of the seal showing a radially inward orientation of the elastomeric ring.

FIG. 2. is similar to FIG. 1. wherein the orientation of the elastomeric seal ring is radially outward.

FIG. 3. depicts another embodiment of the invention in radial cross-section, wherein the elastomeric seal ring is oriented axially fior use as a face seal.

FIG. 4. depicts yet another embodiment in cross-section, wherein the elastomeric ring is oriented angularly toward the axis of rotation against a male conical sealing surface.

FIG. 5. similarly shows yet another embodiment with a female conical sealing surface wherein the elastomeric ring is oriented angularly outward from the axis of rotation.

FIG. 6. is a partial section through a rotary rock cutter and associated supporting journal assembly illustrating a seal constructed in accordance with the present invention.

DESCRIPTION OF THE PREFERRED EMBODIMENT AND PREFERRED MODE FOR CARRYING OUT THE INVENTION

FIG. 1 illustrates a preferred embodiment of the invention, an inwardly oriented radial shaft seal. This figure is an enlarged cross-section taken radially through the seal. A first structural member 12 forms a first smooth annular sealing surface 13 which is substantially concentric to the substantially fixed mutual axis of rotation. A second structural member 14 forms a second annular surface 22 having a spaced-apart relationship to the first smooth annular surface 13. An undersized locking channel 26 is formed by and within second structural member 14, being centrally located on the second annular surface 22. A first annular portion 23 of elastomeric annular packing ring 20 is compressively forced into locking channel 26 completely filling channel 26 establishing a mutually interlocking relationship therebetween. A second annular portion 30 of annular packing ring 20 is thus distended into impingement with first smooth annular surface 13 producing an operable sealing contact therewith. Second portion 30 of annular packing ring 20 crosses the space provided between first smooth annular surface 13 and second annular surface 22 thus dividing that space into two annular working chambers, external annular chamber 25, and internal annular chamber 29. Second portion 30 of packing ring 20 is thus displaced forming cross sectional bulge 24 which extends into external working chamber 25, and forming cross sectional bulge 28 which extends into internal working chamber 29. Bulges 24 and 28, being formed of second annular portion 30 of packing ring 20, act to positively bias the second portion 30 of packing ring 20 into constant sealing contact with first smooth annular surface 13 of first structural member 12, said sealing contact remaining substantially constant during dynamic perturbations of second structural member 14 relative to first structural member 12.

The first annular portion 23 of packing ring 20 forms a positive static seal with locking channel 26 of the second structural member 14.

FIG. 2 illustrates an alternative design for a radial shaft seal similar to that shown in FIG. 1, showing a seal wherein the elastomeric ring is oriented radially outward. This figure is a radial cross section taken through one side of the seal. The identifying numbers and description are the same as used for FIG. 1.

FIG. 3 illustrates an alternate embodiment of the invention, an axially oriented design for use as a face seal. This figure is an enlarged cross-section taken radially through one side of the seal. A first structural member 40 forms a first radially extending smooth annular sealing surface 51 which is substantially concentric to the substantially fixed mutual axis of rotation. A second structural member 42 forms a second radially extending annular surface 46 having a spaced-apart relationship to the first smooth annular surface 51. An undersized locking channel 48 is formed by and within second structural member 42, being centrally located on the second annular surface 46. A first annular portion 53 of elastomeric annular packing ring 49 is compressively forced into locking channel 48 completely filling channel 48 establishing a mutually interlocking relationship therebetween. A second annular portion 50 of annular packing ring 49 is thus distended into impingement with first smooth annular surface 51 producing an operable sealing contact therewith. Second portion 50 of annular packing ring 49 crosses the space provided between first smooth annular surface 51 and second annular surface 46 thus dividing that space into two annular working chambers, external annular chamber 52, and internal annular chamber 56. Second portion 50 of packing ring 49 is thus displaced forming cross sectional bulge 54 which extends into external working chamber 52, and forming cross sectional bulge 58 which extends into internal working chamber 56. Bulges 54 and 58, being formed of second annular portion 50 of packing ring 49, act to positively bias the second portion 50 of packing ring 49 into constant sealing contact with first smooth annular surface 51 of first structural member 40, during dynamic perturbations relative to second structural member 42. The first annular portion 53 of packing ring 49 forms a positive static seal with locking channel 48 of the second structural member 42.

FIG. 4 shows yet another alternate embodiment of the invention, wherein the orientation of the seal ring is angularly inward relative to the axis of rotation, and the first smooth annular surface is male conical. This design combines features shown in FIG. 1 and FIG. 3. This figure is an enlarged cross-section taken radially through one side of the seal. A first structural member 60 forms a first conically extending smooth annular sealing surface 71 which is substantially concentric to the substantially fixed mutual axis of rotation. A second structural member 62 forms a second conically extending annular surface 66 having a spaced-apart relationship to the first smooth annular surface 71. An undersized locking channel 68 is formed by and within second structural member 62, being centrally located on the second annular surface 66. A first annular portion 73 of elastomeric annular packing ring 69 is compressively forced into locking channel 68 completely filling channel 68 establishing a mutually interlocking relationship therebetween. A second annular portion 70 of annular packing ring 69 is thus distended into impingement with first smooth annular surface 71 producing an operable sealing contact therewith. Second portion 70 of annular packing ring 69 crosses the space provided between first smooth annular surface 71 and second annular surface 66 thus dividing that space into two annular working chambers, external annular chamber 72, and internal annular chamber 76. Second portion 70 of packing ring 69 is thus displaced forming cross sectional bulge 74 which extends into external working chamber 72, and forming cross sectional bulge 78 which extends into internal working chamber 76. Bulges 74 and 78, being formed of second annular portion 70 of packing ring 69, act to positively bias the second portion 70 of packing ring 69 into constant sealing contact with first smooth annular surface 71 of first structural member 60, during dynamic perturbations relative to second structural member 62. The first annular portion 73 of packing ring 69 forms a positive static seal with locking channel 68 of the second structural member 62.

FIG. 5 is similar to FIG. 4, wherein the first smooth annular seal surface is a female cone, and the elastomeric seal ring is oriented angularly outward from the axis of rotation. The physical description and the identifying numbers are the same as for FIG. 4, above, except for the gender of first smooth annular seal surface 71.

FIG. 6 shows part of a typical rotary rock bit, generally designated as 10, featuring a first structural member 12, defined herewith as comprising a rock bit body featuring a downwardly projecting portion which in turn forms and supports a cantilevered bearing journal further extending downward and radially inward. The firststructural member 12 rotatably supports a second structural member 14, defined herewith as a rotary rock cutter, having an outer surface 15 studded with inserted hard metal rock cutting teeth 16. Bearing balls 18 typically retain the second structural member (rotary rock cutter) 14 on the first structural member (bearing journal) 12. A smooth annular sealing surface 13, being concentric to the mutual axis of rotation, is formed by and on first structural member (bearing journal) 12. An annular surface 22 is formed by and within second structural member (rotary rock cutter) 14, being substantially concentric to smooth annular sealing surface 13, and having a spaced apart relationship thereto, thereby defining annular working chamber (25,29). An annular locking channel 26 is formed by and within second structural member (rotary rock cutter) 14, and being centrally located on annular surface 22 of second structural member (rotary rock cutter) 14. A first annular portion 23 of elastomeric packing ring 20 is compressively confined conformably within annular locking channel 26. A second remaining annular portion 30 of packing ring 20, being unconfined by undersized locking channel 26, is distended radially inward into sealing contact with smooth annular surface 13 of first structural member (bearing journal) 12.

The detail of this radial sealing system can be more clearly seen by referring again to the enlarged cross-section, FIG. 1.

A first annular portion 23 of the elastomeric annular packing ring 20, is compressively forced to conformably fill locking channel 26. An annular portion 30 of packing ring 20, which is unconfined by locking channel 26, is distended radially inward across annular working chamber (25,29) into sealing contact with smooth annular surface 13 of the first structural member (bearing journal) 12, thus dividing the annular working chamber into an exterior working chamber 25 and an interior working chamber 29. Packing ring portion 30, being radially displaced both inwardly and outwardly, distends into chamber portion 25 and chamber portion 29, forming cross sectional bulges 24 and 28 respectively. Being of material displaced from packing ring portion 30, bulges 24 and 28 constitute dynamically compliant reserves of internally biased elastomer which support packing ring portion 30 and act to regulate and distribute sealing contact pressure of packing ring portion 30 against smooth annular surface 13 of first structural member (bearing journal) 12.

It should be obvious that this invention may be practiced using any orientation of annular packing ring to annular seal surface desired, for example:
  a. with the sealing surface being radially outboard of the packing ring,
  b. with the sealing surface being radially inboard of the packing ring, as shown in FIGS. 1 and 2,
  c. with the sealing surface being axially displaced relative to the packing ring, as shown in FIG. 3,
  d. or with a conical concentric sealing surface being both axially and radially displaced relative to the packing ring.

Consider the total packing ring system to be an assemblage of identical incremental cross-sections, each such cross-section being contained in a radial plane. Each increment is constrained by the locking channel to stay in-line with the other increments. Thus organized, no increment can avoid a working pressure by "side-stepping" into a side clearance (as in the prior art) to weaken the total effectiveness of the seal.

Some viable seal designs practicing this invention may require, or benefit from special tools to aid in the installation of the packing ring into the locking channel.

Elastomeric annular seal rings having cross-sectional shapes other than as depicted herein, for example, polygonal, lobed elliptical, or convoluted, are considered to be included in this invention as long as they are used in the manner described herein.

It should be obvious that the mutually interlocking relationship between the locking channel and the elastomeric seal ring may be accomplished by methods other than as described herein, for example, through mechanical clamping, adhesive bonding, or vulcanization, and are also considered to be a part of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A packing ring seal for a bearing in a rolling cone rock bit, comprising:
   a structural body, said structural body supporting
   at least one cantilevered downwardly extending journal shaft, said journal shaft rotatively supporting
   a rock cutting cone,
   a smooth annular sealing surface formed by said journal shaft,
   an annular surface formed by said rock cutting cone, said annular surface having a spaced-apart relationship with said smooth annular sealing surface,
   defining therebetween a working chamber,
   an annular locking channel formed by said rock cutting cone, said channel being centrally located on said annular surface of said rock cutting cone, and
   an annular solid elastomeric packing ring,
   wherein, a first annular portion of said packing ring is secured within said locking channel in mutually interlocking relationship therewith, and distending a second annular portion of said packing ring, said second portion extending across said working chamber to dynamically impinge said smooth sealing surface of said journal shaft in an annularly sliding mutually sealing interrelationship therebetween.

2. The invention as described in claim 1 wherein said solid elastomeric packing ring is made of a nitrile compound.

3. The invention as described in claim 1 wherein said solid elastomeric packing ring is an O-ring.

* * * * *